(12) United States Patent
Ochi

(10) Patent No.: US 6,618,332 B2
(45) Date of Patent: Sep. 9, 2003

(54) CAROUSEL TYPE CHANGER

(75) Inventor: Hiroshi Ochi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/985,684

(22) Filed: Nov. 5, 2001

(65) Prior Publication Data

US 2002/0060957 A1 May 23, 2002

(30) Foreign Application Priority Data

Nov. 21, 2000 (JP) ................................ P2000-354752

(51) Int. Cl.$^7$ ................................ G11B 17/24
(52) U.S. Cl. ................ 369/30.79; 369/30.94; 369/30.95
(58) Field of Search ............... 369/30.5, 30.62, 369/30.71, 30.79, 30.8, 30.86, 30.91, 30.93, 30.94, 30.95, 30.96, 30.97; 360/98.04, 98.05, 98.06

(56) References Cited

U.S. PATENT DOCUMENTS

| | | | |
|---|---|---|---|
| 4,815,057 A | * | 3/1989 | Miller et al. ............. 369/30.86 |
| 5,115,419 A | * | 5/1992 | Akiyama et al. .......... 369/30.95 |
| 5,307,331 A | * | 4/1994 | d'Alayer de Costemore d'Arc ..... 369/30.86 |
| 5,742,571 A | * | 4/1998 | Hoshino et al. .......... 369/30.98 |
| 5,771,213 A | * | 6/1998 | Koshino et al. .......... 369/30.91 |
| 5,848,035 A | * | 12/1998 | Nakao ..................... 369/30.33 |
| 5,856,894 A | * | 1/1999 | Marlowe .................... 360/92 |

FOREIGN PATENT DOCUMENTS

| | | | |
|---|---|---|---|
| JP | 8-7454 | | 1/1996 |
| JP | 11-149697 | * | 6/1999 |

* cited by examiner

*Primary Examiner*—David L. Ometz
(74) *Attorney, Agent, or Firm*—Morgan, Lewis & Bockius LLP

(57) ABSTRACT

A carousel type changer includes a disk reproducing section (a pickup 62 and so on) which is provided on a tray 21 and adapted to clamp a disk held on a disk holding part 34b and to reproduce the clamped disk, and a disk recording section (a pickup 52 and so on) which is provided separately from the tray 21, and adapted to clamp a disk held on a disk holding part 34a when the tray is in a storing position and to record, on the clamped disk, signals reproduced by the disk reproducing section. In a state where the disk recording section have clamped the disk 15, a rotary table 31 is allowed to rotate.

2 Claims, 4 Drawing Sheets

CAROUSEL TYPE CHANGER

BACKGROUND OF THE INVENTION

1. Technical Field

The present invention relates to a carousel type changer which can reproduce a desired one of a plurality of disks placed on a rotary table, and at the same time, can record reproduced signals on a disk.

2. Related Art

FIG. 5 shows an apparatus for facilitating an operation of selecting favorite musical numbers out of a plurality of CDs, and recording the selected numbers in a single CD-R. The apparatus as shown in FIG. 5 includes reproducing means 95 which can contain three disks (for example, CD) inserted through a slot 94, and can reproduce a desired one out of the three disks contained. The apparatus further includes recording means 93 which can record signals reproduced by the reproducing means 95 on a recordable disk (for example, CD-R) inserted through a slot 92. As the results, a user can automatically record on the disk only the favorite numbers out of many musical numbers which have been recorded on the three disks, only by inputting an operation for selecting only the favorite numbers out of all the numbers recorded on the three disks which are contained in the reproducing means 95 (referred to as a first prior art)

Another prior art is disclosed in the Unexamined Japanese Patent Application Publication No. Hei8-7454. In this prior art, there is provided a disk storing part which can contain a plurality of MDs. There is also provided a CD reproducing block. In case of dubbing from a CD to an MD, the MD which has recording time over the total playback time of the CD is selected out of the plurality of MDs contained in the disk storing part, and dubbing of the CD on the selected MD will be conducted. As the results, a user need not check remaining recordable time of the respective MDs and can conduct pleasant dubbing (referred to as a second prior art).

[Problems to be Solved]

However, in employing the first prior art, there have occurred the following problems. The recording means 93 requires a loading mechanism for moving the disk inserted into the slot 92, to a position in which the disk can be clamped. The reproducing means 95 also requires a loading mechanism for moving one of the disks contained, to a position in which the disk can be clamped. In short, two sets of loading mechanisms are required, and this would incur complication of the structure.

On the other hand, the apparatus of the second prior art has a structure capable of containing a plurality of recording media, but a block for reproducing the CD is not particularly described. Therefore, it has been difficult to apply this art to a case where only a single disk is employed as a recording medium, and only selected numbers out of all the numbers in a plurality of disks contained are to be recorded.

SUMMARY OF THE INVENTION

The invention is made in order to solve the above described problems, and its object is to provide a carousel type changer in which a mechanism for moving a disk to a position in which disk recording section can clamp the disk is co-used with a mechanism for moving a disk to a position in which disk reproducing section can clamp the disk, whereby complication of the mechanism for moving the disks will be avoided, even when reproduction of a desired one of a plurality of disks and recording of reproduced signals on a disk can be conducted simultaneously.

In addition to the above described object, it is a further object to provide a carousel type changer in which complication of the mechanism for moving a disk will be avoided, even when a rotary table is allowed to rotate in a state where the disk recording section have clamped the disk, by recording the signals which have been reproduced by the disk reproducing section, on the disk by the disk recording section, in a state where a tray is moved toward a discharging position.

[Means for Solving the Problems]

In order to solve the above described problems, there is provided a carousel type changer comprising a tray provided on an apparatus body so as to be movable between a storing position and a discharging position, and a rotary table rotatably attached to the tray and having a plurality of disk holding parts formed around a rotary shaft, characterized in that the changer includes disk reproducing section which are provided on the tray, and adapted to clamp a disk held on one of the disk holding parts and to reproduce the clamped disk, and disk recording section which are provided separately from the tray, and adapted to clamp a disk held on one of the disk holding parts while the tray is in the storing position and to record, on the clamped disk, signals reproduced by the disk reproducing section, wherein the rotary table is allowed to rotate in a state where the disk recording section have clamped the disk.

As described, the disk recording section clamp the disk held on one of the disk holding part while the tray is in the storing position. As the results, the mechanism for moving a disk to the position in which the disk recording section can clamp the disk is co-used with the mechanism for moving a disk to the position in which the disk reproducing section can clamp the disk. In short, it is not necessary to separately provide a mechanism for moving a disk for the disk recording section.

In addition to the above described structure, in a disk reproducing apparatus in which the tray is movable between the storing position and the discharging position while the disk recording section have clamped the disk, the disk recording section record, on the disk, the signals reproduced by the disk reproducing section, in a state where the tray is moved toward the discharging position up to a position in which the rotary table is allowed to rotate while the disk recording section have clamped the disk.

In other words, in a state where the tray is moved toward the discharging position, the rotary table is allowed to rotate, only by preventing the clamped disk from interfering with the rotary table. The disk recording section have only to clamp the disk in a direction of lifting the disk from the rotary table.

BRIEF DESCIPTION OF THE DRAWING

DETAILED DESCRIPTION OF THE PREFERRED EMBODIMENTS

[Mode for Carrying Out the Invention]

Figure 1:
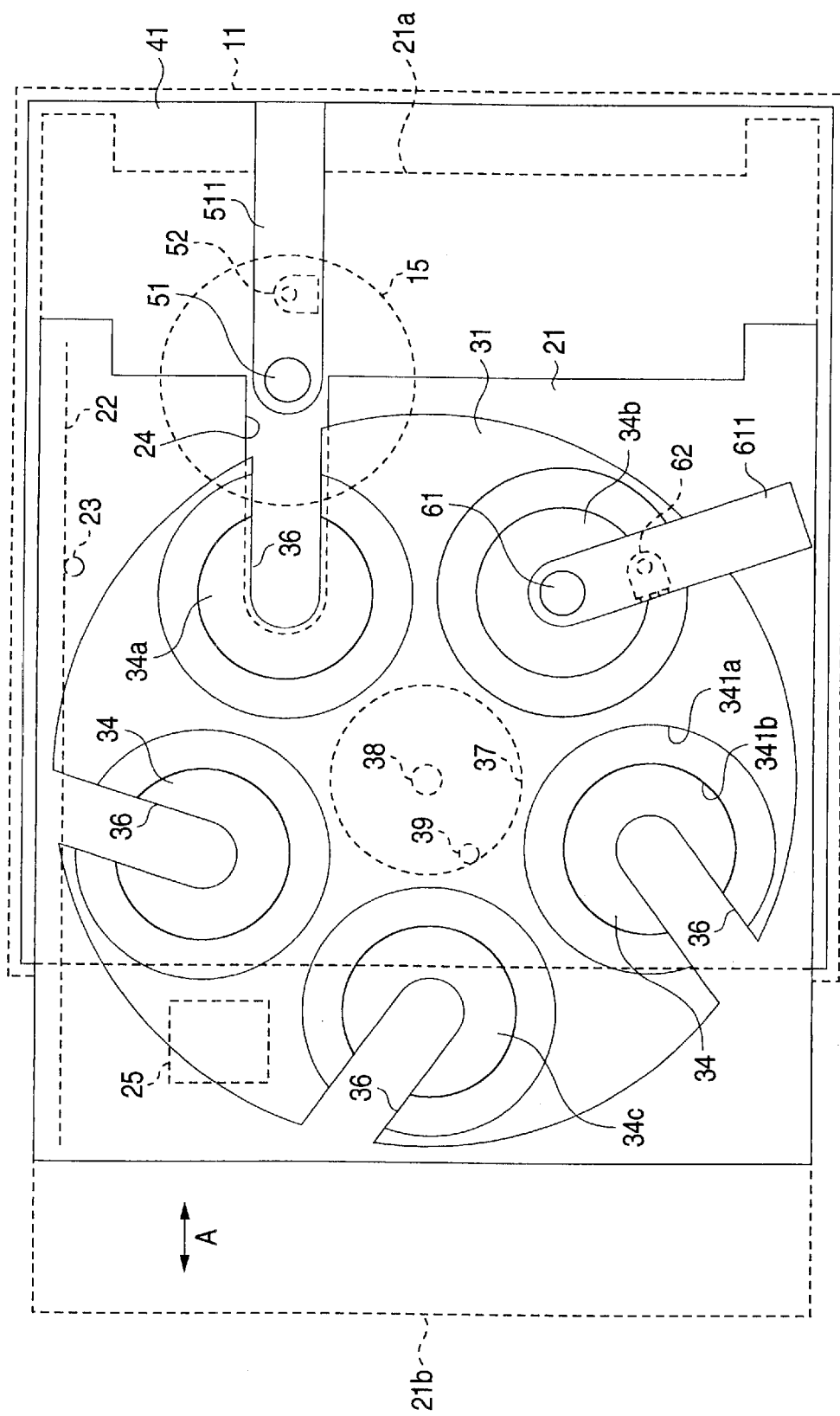
FIG. 1 is a plan view showing schematically a mechanism of a carousel type changer of one embodiment according to the invention.

Now, an embodiment of the invention will be described referring to the drawings.

Figure 2:
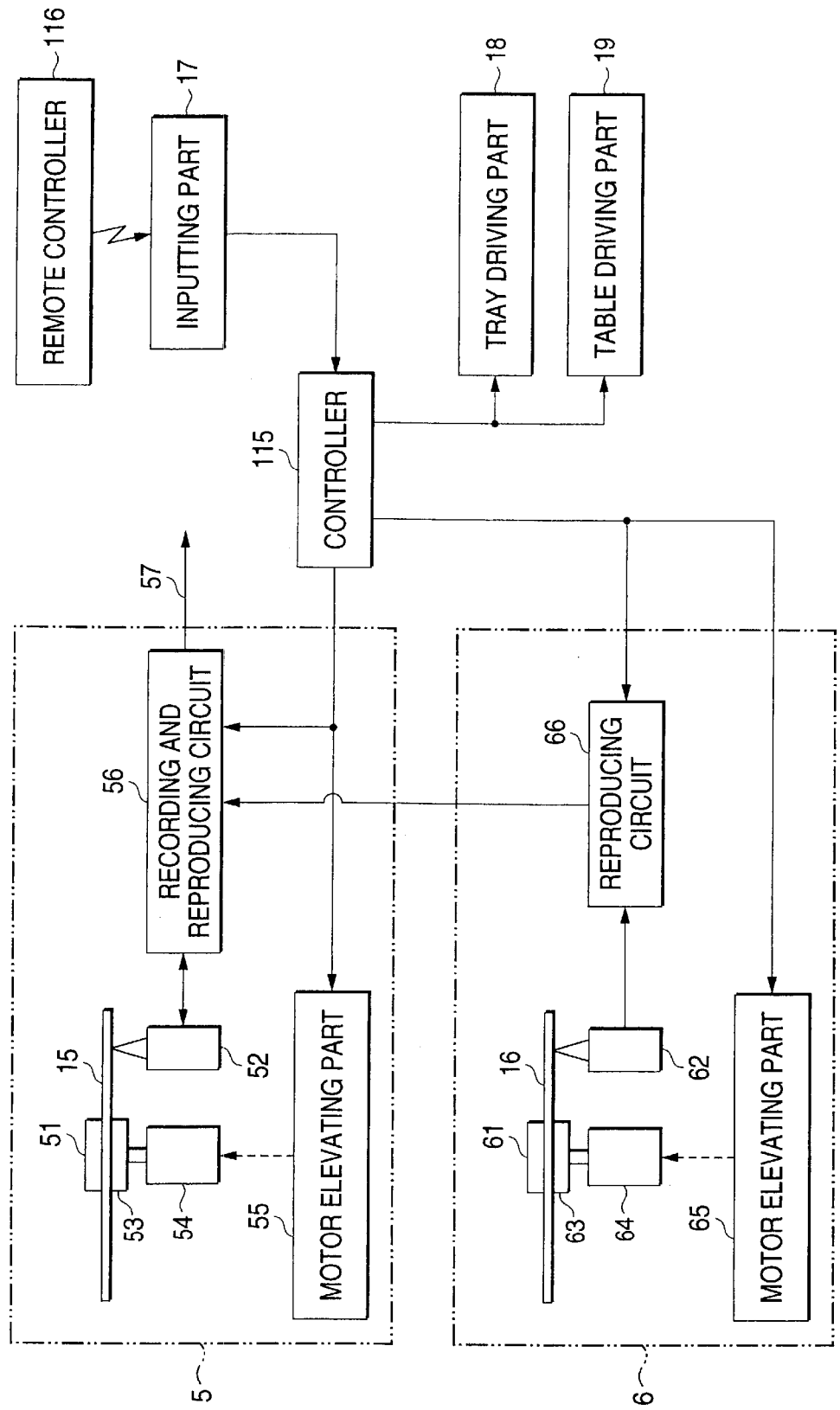
FIG. 2 is a block diagram showing an electrical structure of the embodiment.

FIG. 1 is a plan view showing a mechanism of a carousel type changer of one embodiment according to the invention, and FIG. 2 is a block diagram showing an electrical structure of the embodiment. It is to be noted that the embodiment includes an apparatus in which reproduction of DVD and CD is possible, and at the same time, recording on CD-R and CD-WR is possible.

To begin with, the mechanism will be described. A tray 21 is provided on an apparatus body 11 (shown by a dashed line 11) so as to move between a discharging position and a storing position. Specifically, the tray 21 is mounted on a chassis 41 which is provided inside the apparatus body 11, so as to move in a direction of an arrow A. A rotary table 31 is attached to the tray 21 so as to rotate about a rotary shaft 38. On the rotary table 31, there are formed a plurality of (five in this embodiment) disk holding parts 34a to 34c, 34, 34 (hereinafter referred to as simply disk holding parts 34) around the rotary shaft 38.

Each of the disk holding parts 34 is formed with a step 341a for 12 cm disk, and a step 341b for 8 cm disk. There is also formed, in each of the disk holding parts 34, a cut-out 36 into which a turntable 53 and a pickup 52 for clamping a disk 15 in combination with a disk damper 51 are adapted to be inserted. The cut-out 36 is directed toward an outer circumference of the rotary table 31 at an inclined angle of about 36 degree with respect to a radial direction of the rotary table 31.

There is also formed a cut-out 24 at a backward end of the tray 21 so as to communicate with the cut-out 36 of the disk holding part 34a corresponding to the position. Accordingly, even when the disk 15 is in a state clamped by the disk damper 51 and the turntable 53, the tray 21 and the rotary table 31 can move from the storing position to the discharging position without interfering with the turntable 53 and the pickup 52.

The disk damper 51 is supported by a support member 511 which is fixed to the chassis 41 at its one end, in such a manner that the disk damper 51 can rotate above the rotary table 31. A disk motor 54 for rotating the turntable 53 is provided below the disk damper 51 so as to be elevated when recording and reproduction are conducted, and descend when recording and reproduction are not conducted, by a motor elevating part 55 attached to the chassis 41.

As the results, when the tray 21 is moved toward the discharging position (as shown by a dotted line 21b), until a block mainly consisting of the disk motor 54 comes to a position outward of an outer circumference of the rotary table 31, the rotary table 31 is allowed to rotate, even when the disk 15 is in a clamped state by the disk damper 51 and the turntable 53.

Moreover, there is provided a support member 611 which is fixed at its one end to the tray 21, above and along the cut-out of the disk holding part 34b. A disk damper 61 is supported by the support member 611 in such a manner that it can rotate above the rotary table 31. A disk motor 64 for rotating a turntable 63 is provided below the disk damper 61 so as to be elevated when reproduction is conducted, and descend when reproduction is not conducted, by a motor elevating part 65 attached to the tray 21.

A tray driving part 18 is a block mounted on the chassis 41, and includes a motor and a pulley which are not shown, and a gear 23. The gear 23 is engaged with a rack 22 which is formed along an inner face of a lower part of the tray 21, and thus, the tray 21 is driven to be moved between the discharging position and the storing position.

A table driving part 19 is a block mounted on the tray 21, and includes a motor and a worm gear which are not shown, and a gear 39 adapted to be meshed with the worm gear. The gear 39 is engaged with a gear 37 which is formed on a lower face of the rotary table 31, and thus, the rotary table 31 is driven to rotate.

There is further provided a weight 25 at a position substantially opposed to the disk clamper 61 with respect to the center 38 of the rotary table 31, in order to make a balance with weight of the disk motor 64 and the pickup 62 which are provided below the disk damper 61. As the results, the tray 21 can move with a good balance.

The embodiment includes, when generally classified as an electrical structure, disk recording and reproducing section 5, disk reproducing section 6, a remote controller 116, an inputting part 17, the tray driving part 18, the table driving part 19, and controller 115.

The disk recording and reproducing section 5 is a block for clamping the disk 15 which is held on the disk holding part 34a, when the tray 21 is at the storing position (a position as shown by a dashed line 21a in FIG. 1), and for reproducing the clamped disk 15 thereafter. Moreover, signals reproduced by the disk reproducing section 6 are recorded in the clamped disk 15.

Specifically, the signals recorded on the disk 15 which is clamped by the disk damper 51 and the turntable 53 will be detected by means of the pickup 52. Then, the signals detected by the pickup 52 are treated as predetermined by means of a recording and reproducing circuit 56, thereby to reproduce analogue voice signals 57. The pickup 52 will be actuated by signals obtained by conducting predetermined treatment of digital voice signals transmitted from the disk reproducing section 6 by means of the recording and reproducing circuit 56, thereby to record the signals reproduced by the disk reproducing section 6 on the disk 15.

The disk reproducing section 6 is a block for clamping the disk 16 held on the disk holding part 34b in a state where the tray 21 is in a desired position, and for reproducing the clamped disk 16 thereafter. In other words, signals recorded on the disk 16 which is clamped by the disk damper 61 and the turntable 63 are detected by the pickup 62. Thereafter, the signals detected by the pickup 62 are treated as predetermined by means of a reproducing circuit 66 to reproduce digital voice signals, and at the same time, the reproduced digital voice signals are transmitted to the recording and reproducing circuit 56.

The tray driving part 18 is a block for shifting the tray 21 between the discharging position and the storing position. On both occasions when the disk 15 is clamped by the disk recording and reproducing section 5 and when the disk 15 is not clamped, the tray 21 is shifted from the storing position to the discharging position or from the discharging position to the storing position by the tray driving part 18. The table driving part 19 is a block for rotating the rotary table 31 when the disks to be reproduced in the disk recording and reproducing section 5 and the disk reproducing section 6 are exchanged, or when the disks to be placed on the disk holding parts 34 are exchanged.

The remote controller 116 is a block in which a plurality of key switches are provided, and commands for various operations are entered by a user. The inputting part 17 is a block in which a plurality key switches such as a power switch, and a light receiving part for receiving an infrared ray from the remote controller 116 are provided. The controller 115 is a block for controlling the operation as the carousel type changer.

In case where recording on the disk is not conducted, but simple reproduction only is conducted, the reproduction will be conducted by the disk recording and reproducing section 5. In this case, therefore, by moving the tray to the discharging position, the rotary table 31 can be rotated during the reproduction of the disk.

Figure 3:
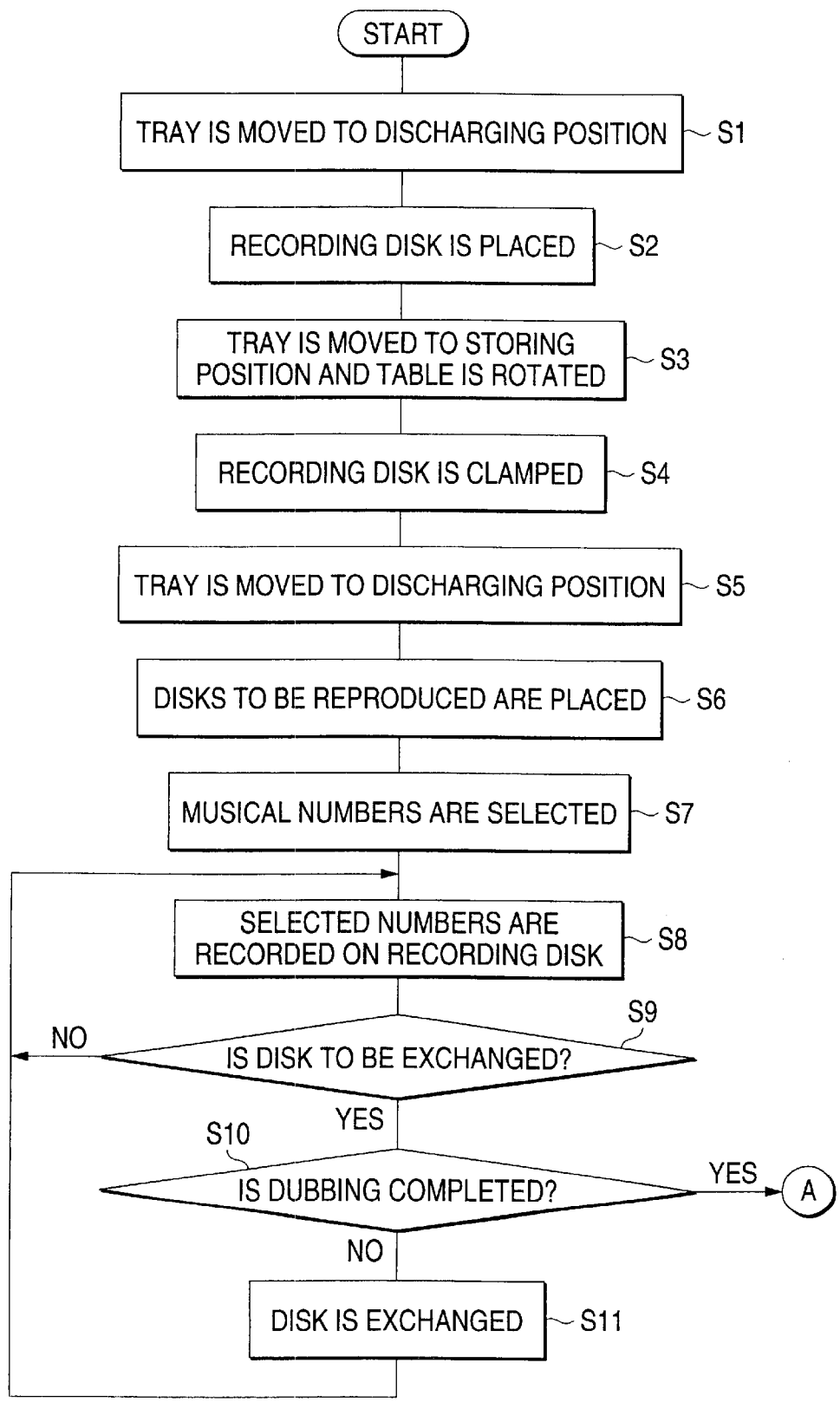
FIG. 3 is a flow chart showing essential operations of the embodiment.
Figure 4:
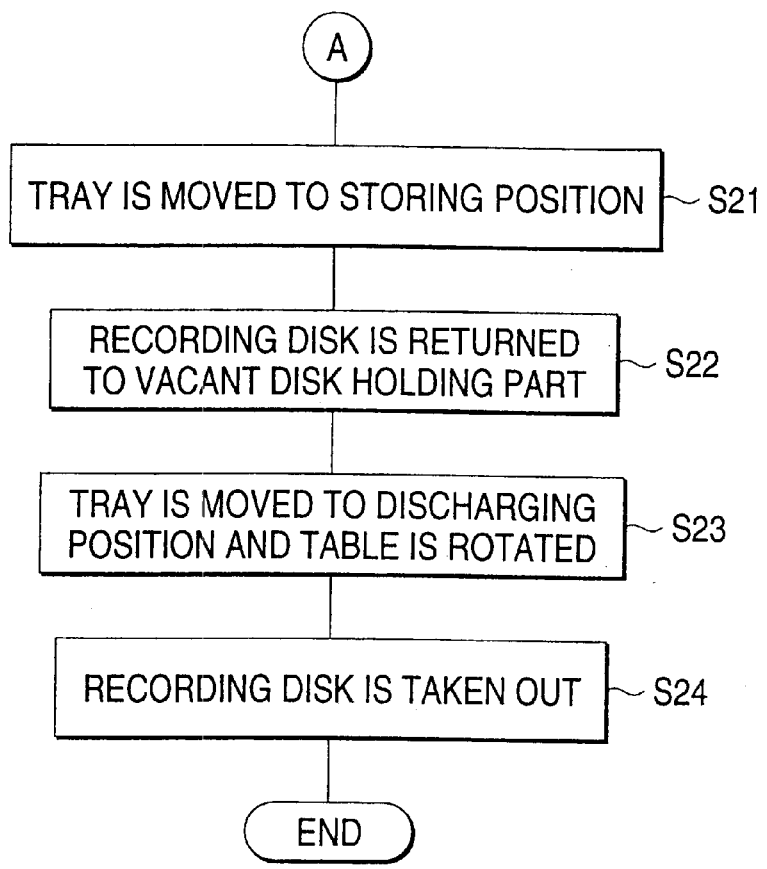
FIG. 4 is a flow chart showing the essential operations of the embodiment.
Figure 5:
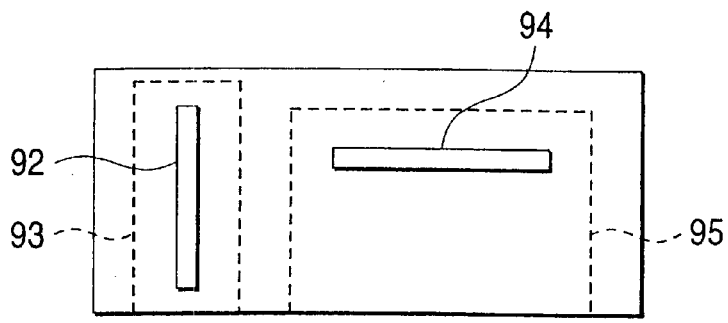
FIG. 5 is an explanatory view showing a structure of a prior art.

FIGS. 3 and 4 are flow charts showing essential operations of the embodiment. The operations of the embodiment will be described referring to the drawings according to necessity.

By operating the key switch of the remote controller 116 or the key switch of the inputting part 17, the tray 21 will be moved from the storing position indicated by the dashed line 21a to the discharging position indicated by the dashed line 21b (Step S1). In this state, a recording disk (CD-R, for example) is placed on the disk holding part 34c of the rotary table 31 (Step S2). Thereafter, a command for clamping is entered. When this command is entered, the controller 115 will move the tray 21 to the storing position, and allow the rotary table 31 to rotate, thereby to move the recording disk to a position of the disk recording and reproducing section 5 in which the recording disk can be clamped (Step S3). Thereafter, the recording disk is clamped by the disk recording and reproducing section 5 (Step S4).

Then, by entering a command for moving the tray 21, the tray 21 will be moved to the discharging position (Step 5). Thereafter, a plurality of disks to be reproduced (to be dubbed) are placed one after another on the rotary table 31 (Step S6). Thereafter, of all the musical numbers in the plurality of the disks placed on the rotary table 31, numbers to be dubbed are inputted by means of the remote controller 116 and so on (Step S7).

After the numbers to be dubbed have been inputted, in the state where the tray 21 is in the discharging position, the controller 115 allow the disk reproducing section 6 to clamp the disks having the relevant numbers recorded thereon, and start to reproduce them. Simultaneously with this reproduction, the controller allows the disk recording and reproducing section 5 to start the recording operation. Thus, dubbing of the relevant numbers will be conducted on the recording disk (Step S8). After the dubbing of the relevant numbers is completed, whether or not the same disk has the number to be dubbed next will be determined, and in case where it has, dubbing of the next number will be conducted (Steps S9, S8).

After the dubbing of all the numbers in the same disk is completed, the controller 115 will determine whether or not the dubbing is completed (Step S10). In case where the dubbing is not completed, the controller 115 allow the rotary table 31 to rotate, and allow the disk reproducing section 6 to clamp the disk having the numbers to be dubbed next (Step S11) Thereafter, the dubbing will be conducted (Step S8).

After the dubbing of all the numbers is completed, the controller 115 will shift the operation from Step 10 to Step 21 to move the tray 21 to the storing position. Then, by rotating the rotary table 31, the recording disk which is clamped by the disk recording and reproducing section 5 will be placed on a vacant disk holding part 34 (Step S22). Thereafter, the tray is moved to the discharging position, and at the same time, the disk holding part on which the recording disk is placed is moved to the position indicated by 34c (Step S23). In this state, the user can take out the recording disk (Step S24).

On occasion of dubbing, the disks to be placed on the rotary table 31 can be exchanged one after another to conduct the dubbing. In this case, the numbers selected from over five disks can be recorded in a single recording disk.

Although the case in which a plurality of disks placed on the rotary table 31 are dubbed on the recording disk in a state where the tray 21 is in the discharging position is described referring to the above described embodiment, it is possible to conduct the dubbing in a state where the tray 21 is in a desired position, as long as the rotary table 31 can rotate while the disk recording and reproducing section 5 have clamped the recording disk.

In other words, the changer may have such a structure that the dubbing can be conducted in such a position of the tray 21 that the block mainly consisting of the disk motor 54 of the disk recording and reproducing section 5 is located outside of the outer circumference of the rotary table 31 as indicated by numeral 21 in FIG. 1. In case of this structure, a projected length of the tray 21 which is projected from the apparatus body 11 can be shorter.

[Effects of the Invention]

As described herein above, the carousel type changer according to the invention includes the disk reproducing section which are provided on the tray, and adapted to clamp a disk held on one of the disk holding parts and to reproduce the clamped disk, and the disk recording section which are provided separately from the tray, and adapted to clamp a disk held on one of the disk holding parts while the tray is in the storing position and to record, on the clamped disk, signals reproduced by the disk reproducing section, wherein the rotary table is allowed to rotate in a state where the disk recording section have clamped the disk. As the results, the mechanism for moving a disk to the position in which the disk recording section can clamp the disk is co-used with the mechanism for moving a disk to the position in which the disk reproducing section can clamp the disk. Accordingly, complication of the mechanism for moving the disks will be avoided, even when reproduction of a desired one of a plurality of disks and recording of reproduced signals on a disk can be conducted simultaneously.

In addition, in a structure in which the tray is movable between the storing position and the discharging position while the disk recording section have clamped the disk, the disk recording section record, on the disk, the signals reproduced by the disk reproducing section, in a state where the tray is moved toward the discharging position up to a position in which the rotary table is allowed to rotate while the disk recording section have clamped the disk. Accordingly, the disk recording section have only to clamp the disk in a direction of lifting the disk from the rotary table, and complication of the mechanism of the disk recording section will be avoided, even when the rotary table is allowed to rotate in a state where the disk recording section have clamped the disk.

What is claimed is:

1. A carousel type changer comprising:

a tray provided on an apparatus body so as to be movable between a storing position and a discharging position, a rotary table rotatably attached to said tray and having a plurality of a disk holding parts formed around a rotary shaft, disk reproducing section which is provided on said tray, and adapted to clamp a disk held on one of said disk holding parts and to reproduce said clamped a disk, and disk recording section which is provided separately from said tray, and adapted to clamp a disk held on one of said disk holding parts while said tray is in said storing position and to record, on said clamped disk, signals reproduced by said disk reproducing section, wherein said rotary table is allowed to rotate in a state where said disk recording section has clamped said disk.

2. The carousel type changer as in claim 1, wherein in a disk reproducing apparatus in which said tray is movable between said storing position and said discharging position while said disk recording section clamps said disk, said disk recording section recording, on said disk, said signals reproduced by said disk reproducing section, in a state where said tray is moved toward the discharging position up to a position in which said rotary table is allowed to rotate while said disk recording section clamps said disk.

* * * * *